United States Patent [19]

Outhwaite

[11] Patent Number: 4,489,236
[45] Date of Patent: Dec. 18, 1984

[54] METHOD FOR CALIBRATING SCINTILLATION CRYSTAL

[75] Inventor: Stephen J. Outhwaite, Clarks Summit, Pa.

[73] Assignee: Fairchild Weston Systems, Inc., Archbald, Pa.

[21] Appl. No.: 322,501

[22] Filed: Nov. 18, 1981

[51] Int. Cl.$^3$ .................. G01T 1/202; G01D 18/00
[52] U.S. Cl. .................. 250/252.1; 250/369; 378/56
[58] Field of Search .............. 378/56, 19; 250/252.1, 250/362, 369, 361 R, 363 R, 363 S

[56] References Cited

U.S. PATENT DOCUMENTS 4,044,261  8/1977  Wilson ..................... 250/369

FOREIGN PATENT DOCUMENTS 122185   9/1979  Japan ..................... 250/369
1489345 10/1977  United Kingdom ........ 250/361 R

*Primary Examiner*—Alfred E. Smith
*Assistant Examiner*—Carolyn E. Fields
*Attorney, Agent, or Firm*—Dale Gaudier

[57] ABSTRACT

An X-ray or gamma-ray scintillation crystal used in a radiation-type thickness gauge is calibrated by irradiating the scintillation crystal at a high intensity and then abruptly lowering the intensity to a low level (e.g. 1/100 the high intensity level). The nonlinear response of the crystal due to after-glow and hysteresis is periodically measured and correlated with an ideal (e.g. linear) response function. The radiation level is then increased to its former high intensity and periodic measurements are made of the nonlinear response of the crystal. The correlated values are stored, for example, in a computer memory as a table of time dependent correction factors. The stored values are used to correlate a measured signal from the scintillation crystal regardless of the radiation intensity and the hysteresis of the crystal and without having to wait for the "afterglow" to disappear in order to make subsequent measurements.

13 Claims, 6 Drawing Figures

—— = ACTUAL OUTPUT
---- = IDEAL OUTPUT

METHOD FOR CALIBRATING SCINTILLATION CRYSTAL

FIELD OF THE INVENTION

The invention relates to radiation-type gauging systems and, more particularly, to a method for calibrating a scintillation crystal used in such gauging systems.

BACKGROUND OF THE INVENTION

Radiation-type thickness gauges have been in use for many years and are generally employed in locations or situations, such as hot metal rolling mills, where contact-type thickness gauges cannot be used.

Radiation-type thickness gauges generally comprise a source of penetrating electromagnetic radiation (such as X-rays or gamma rays), a scintillation crystal (such as NaI) sensitive to this radiation, and a photomultiplier or photodiode for detecting the light output of the scintillation crystal and converting it into an output voltage which is substantially proportional to the intensity of radiation incident on the crystal.

Radiation intensity is defined as the photon flux, i.e. the number of photons emitted per second by the radiation source. Individual photons have energies ranging from approximately 5–150 KeV (for X-rays) to 60–1000 KeV (for gamma rays).

Once the radiation intensity incident on the crystal is calibrated, such as by placing a standard metal sample of known alloy composition and thickness between the radiation source and the photomultiplier, the output of the photomultiplier can be correlated with the thickness of an unknown material placed between the radiation source and photomultiplier. Preferably, the photomultiplier output is digitized and the correlation of the thickness measurement is accomplished through the use of a programmable data processor. Such measurement and correlation schemes are shown, for example, in U.S. Pat. Nos. 4,009,376 and 4,119,846.

One drawback to the operation of radiation-type gauges which use scintillation crystals is that the response of such crystals is not strictly linear, especially when there are large changes (a factor of approximately 100 or greater) in the intensity of radiation incident on the crystal. If the crystal has been operating under a high level of incident radiation (for example $10^{10}$ photons/sec. for an X-ray source or $10^6$ photons/sec. for a gamma ray source), and this incident radiation is suddenly reduced to a lower level (for example $10^7$ photons/sec. for an X-ray source or $10^4$ photons/sec. for a gamma ray source), the light output of the crystal does not immediately fall off. Instead, there is a slow decay in the light output of the crystal due to residual phosphorescence (so-called "afterglow") over several seconds, or even minutes, so that accurate measurements cannot be made by the gauging system until the crystal "afterglow" has disappeared.

A related problem is so-called crystal "hysteresis" which is a reversible change in the output of a crystal during irradiation, i.e. the non-linear response of the crystal to radiation will be different depending on whether the radiation intensity is increasing or decreasing. Both afterglow and hysteresis contribute to the non-linear response of a crystal under conditions of rapidly changing incident radiation. Furthermore, every crystal has its own unique decay characteristics, so that measurements on a "standard" crystal cannot be readily used for calibration purposes.

Several proposals have been made in an attempt to overcome the problems associated with crystal afterglow or hysteresis. For example, in U.S. Pat. No. 4,044,261 the effects of phosphorescent afterglow in a scintillation detector are reduced using a filter network in the detecting circuit. In U.S. Pat. No. 4,245,157 hysteresis and afterglow response of a scintillation crystal is reduced by irradiating the crystal with high energy electrons while heating the crystal to irreversibly change the response characteristic of the crystal material. In U.S. Pat. No. 4,272,677 the afterglow response characteristic of a crystal due to low energy electron bombardment is used to define a "drift-stable" peak in the low-energy spectrum of the crystal. In U.S. Pat. No. 4,079,257 auxiliary radiation sources are used to calibrate the photomultipliers of a scintillation camera. In U.S. Pat. No. 4,223,388 radiation from a reference source is measured and used to form a "correction table" which is applied to measured values of samples to correct for non-linearity of the scintillation camera components due to uneven characteristics of photomultiplier tubes and ageing of circuitry. Finally, U.S. Pat. Nos. 3,732,420 and 3,769,508 describe a calibration system for a scintillation camera which scans an area of interest and detects the area of maximum activity (a so-called "hot-spot"). The intensity value of the "hot-spot" is averaged over time and used to set the value of the maximum density area to be recorded on a chart or film.

While various attempts have been made to reduce the effects of afterglow or hysteresis in a gauging system, none of the described techniques specifically corrects for the non-linear response of a scintillation crystal due to such afterglow or hysteresis.

It is therefore a primary object of the present invention to provide a technique for calibrating a scintillation crystal and, more particularly, to correct for the non-linear response of such a crystal due to afterglow and hysteresis during subsequent gauging cycles.

SUMMARY OF THE INVENTION

These and other objects are achieved by the present invention wherein there is provided a method of calibrating a scintillation crystal, comprising the steps of irradiating the scintillation crystal at a first intensity level with a beam of electromagnetic radiation to which the scintillation crystal is sensitive, abruptly changing the beam intensity to a second level substantially different than the first level, periodically measuring the output of the scintillation crystal during the irradiating steps and generating data representative of the crystal output, correlating this data with data representative of a predetermined response function of the crystal, and storing the resultant correlated data in the form of a table of time dependent correction factors for the scintillation crystal. The table of correction factors is derived from the correlated data and represents the difference between the actual measured response and a predetermined response (e.g. linear) of the scintillation crystal during changes in the intensity level of the incident radiation over a predetermined period of time. The method can further include the step of changing the second intensity level back to the first intensity level after a period of time. The two intensity levels preferably differ by a factor of 100 or more so that the effects of hysteresis and afterglow can be readily measured.

The above-described method can be performed under the control of a programmable data processor which also stores the table of time dependent correction factors for use during a subsequent gauging cycle.

For example, when measurements are made of an article of unknown thickness during a gauging cycle of a radiation-type gauging system which involve changing from a high radiation level to a low radiation level (or vice versa), the measurement readings can be periodically corrected for crystal hysteresis or afterglow by the data processor using the stored table of time dependent correction factors derived during the crystal calibration cycle. In this manner gauging can take place continuously without having to wait for the crystal to recover from the large changes in radiation levels.

BRIEF DESCRIPTION OF THE DRAWING FIGURES

These and other features of the present invention will be apparent from the following detailed description of the preferred embodiment, when taken in conjunction with the drawing figures wherein.

DETAILED DESCRIPTION OF THE PREFERRED EMBODIMENT

Figure 1:
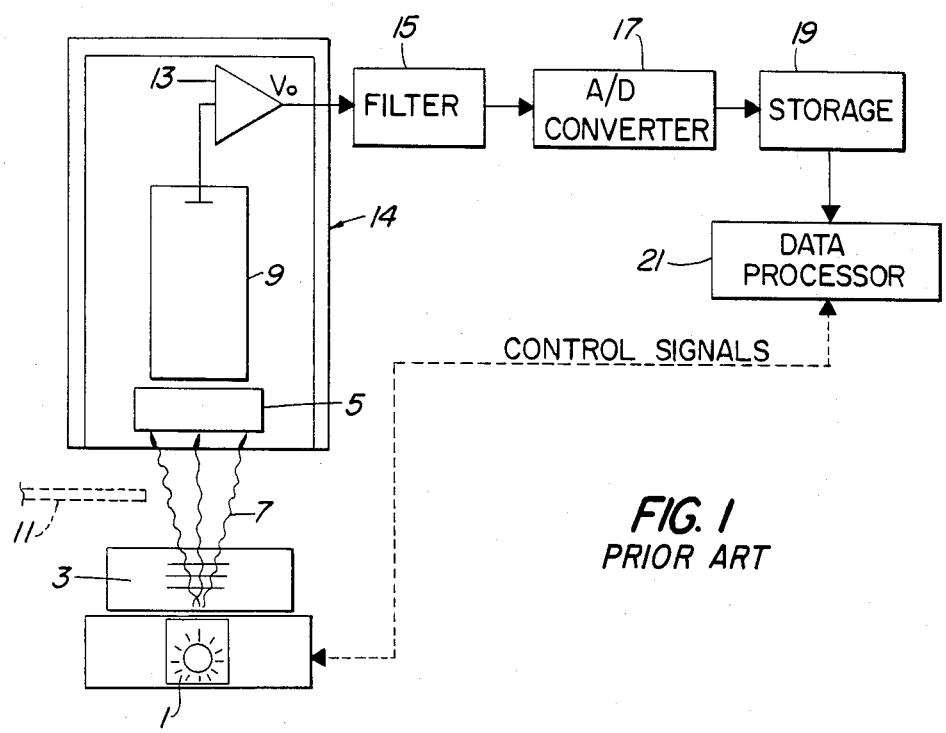
FIG. 1 is a schematic of a typical radiation gauging system useful in practicing the method of the present invention.

FIG. 1 shows a typical radiation gauging system suitable for practicing the method of the present invention. Such systems are well known, as evidenced by the aforementioned U.S. Pat. Nos. 4,009,376 and 4,119,846. Such a gauging system is made by Weston Controls, Div. of Fairchild Weston Systems, Inc., Archbald, Pa., and is sold as its XACTRAY ®2000 non-contact gauging system. This gauging system includes, among other things, a source of penetrating electromagnetic radiation 1 (such as X-ray or gamma ray radiation), a set of calibration standards 3, a scintillation crystal 5 (formed from a radiation responsive material such as NaI or CsI for receiving a beam of radiation 7 formed by source 1, and a photomultiplier or photodiode 9 sensitive to the scintillations of crystal 5. The output of photomultiplier 9 is amplified by amplifier 13 to produce an output voltage $V_o$ which is generally proportional to the amount of light emitted from crystal 5. This, in turn, is generally proportional to the amount or intensity of radiation 7 impinging on crystal 5. Together, crystal 5, photomultiplier 9, and amplifier 13 form a detection device or scintillation camera 14 responsive to radiation from source 1.

As will be appreciated, the radiation intensity level on crystal 5 is a function of the distance between source 1 and crystal 5, the medium through which the beam 7 travels (air, vacuum, etc.), and the density and thickness of any unknown sample 11 (shown in dashed outline in FIG. 1). Since the distance between source 1 and crystal 5 and the density of the medium therebetween is known, and the density of the sample to be measured is usually also known, then after initial thickness calibration steps are performed (using calibrated thickness standards 3) as detailed in the aforementioned U.S. patents, the output of photomultiplier 9 will be a linear function of the thickness of sample 11. The photomultiplier output is applied to amplifier 13 to produce an amplified signal $V_o$ which is proportional to the photomultiplier output. This signal $V_o$ is then applied to a filter 15 and is digitized by an analog-to-digital (A/D) converter 17. The output of A/D converter 17 is applied to a storage means 19, which for example is a random access memory (RAM) or magnetic storage medium.

The data stored in storage means 19 is accessible by a programmable data processor 21. In the aforementioned XACTRAY ®2000 gauging system, data processor 21 takes the form of a Digital Equipment Corp. Model LSI-11 single board microcomputer. Data processor 21 controls the operation of the gauging system and can run automatically under a resident operating program or can accept manual input and control by an operator via an input keyboard.

As mentioned earlier, it is a primary object of the present invention to correct for the deleterious effects of afterglow and hysteresis in a radiation-type gauging system. These deleterious effects in earlier gauging systems include a rather slow response time in gauging articles for thickness, especially when there have been large changes in beam intensity incident on the scintillation crystal. In earlier gauging systems an operator often had to wait several minutes for radiation induced afterglow to disappear before continuing with a gauging or measurement cycle on a new sample.

Figure 2:
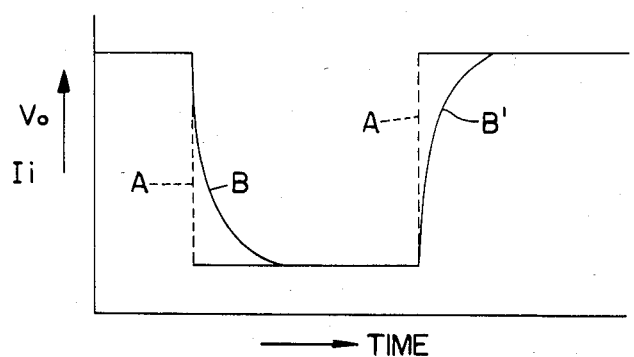
FIG. 2 is a graph of scintillation crystal photomultiplier output vs. time showing both ideal (dashed) and actual (solid) scintillation crystal response curves.
Figure 3:
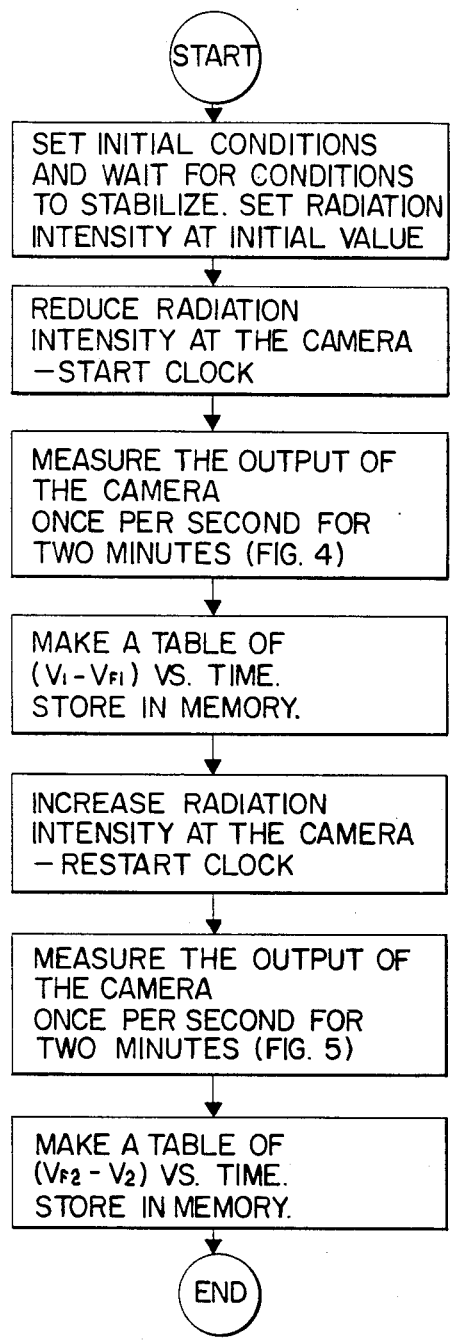
FIG. 3 is a flow chart showing the various steps in practicing the crystal calibration technique of the present invention.

As shown graphically in FIG. 2, in an ideal system, the amplitude of the scintillation camera output $V_o$ would change instantaneously with changes in the intensity ($I_i$) of beam 7 on crystal 5 (curve A). However, known types of scintillation crystals do not exhibit such ideal responses and, in fact exhibit rather non-linear output responses (curves B and B') when the incident radiation $I_i$ is abruptly lowered or raised. This highly non-linear response is due to two effects: afterglow (residual phosphorescence of the crystal material after radiation is lowered) and hysteresis (the response curves B and B' are different from one another and depend on whether the incident radiation intensity $I_i$ is being lowered or raised). Afterglow is the more serious problem of the two because, depending on the crystal material and incident radiation, significant afterglow can remain in a crystal for up to several minutes. During this time it has heretofore been difficult or impossible to make accurate gauging measurements of a sample of unknown thickness 11 (FIG. 1) because of the non-linear non-zero output $V_o$ (curve B, FIG. 2) of scintillation camera 14 due to photomultiplier 9 picking up the residual afterglow of crystal 5.

The method of the present invention overcomes these drawbacks of earlier gauging systems by calibrating the response of the scintillation crystal to changes in incident radiation and using this information to correct for afterglow and hysteresis during a gauging cycle regardless of the amount or rate of change of the intensity of radiation incident on the crystal.

Figure 4:
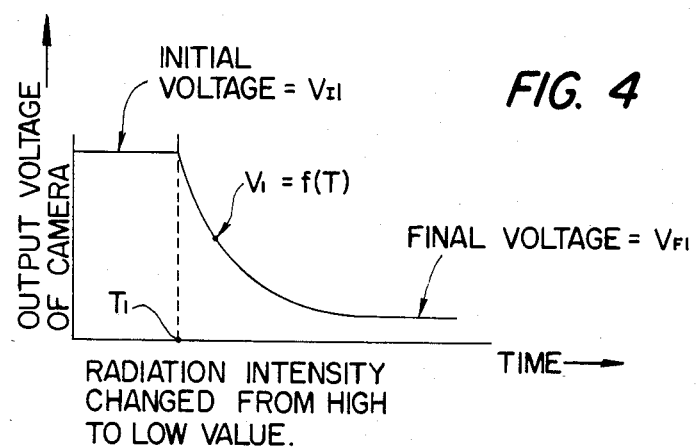
FIGS. 4 and 5 are photomultiplier output vs. time curves useful in explaining the calibration technique of the present invention.

More particularly, with reference to FIGS. 1 and 3-5, the method of initially calibrating a scintillation crystal under the control of a programmable data processor comprises the steps of irradiating the crystal 5 with a beam of radiation 7 having an initial intensity level $I_1$, which for example can be a relatively high intensity (approximately $10^{10}$ photons/sec. for an X-ray source or $10^6$ photons/sec. for gamma ray source). This initial intensity level $I_1$, causes an output signal from the scintillation camera of $V_{I1}$ (FIG. 4).

The beam intensity is then abruptly changed at time $T_1$ to a second intensity level $I_2$ (which for example can be a relatively low intensity of approximately $10^7$ photons/sec. for an X-ray source or $10^4$ photons/sec. for a gamma ray source). Simultaneously, the output signal from the scintillation camera is periodically sampled (for example at one second intervals), digitized, and stored in storage means 19 under control of data processor 21. Sampling continues for a predetermined time (for example two minutes), which is selected to be of a duration sufficient to allow substantially all afterglow in crystal 5 to decay.

As will be appreciated, the output of the scintillation camera at any given moment during this process is a non-linear function of time and can be expressed mathematically as $V_1 = f(T)$, where $V_1$ is the amplitude of the camera output and T is time. After the predetermined time period for sampling has elapsed, the scintillation camera output will have a final value $V_{F1}$.

During the sampling period the data processor stores data representative of a table of $(V_1 - V_{F1})$ vs. time. This table is representative of the differences between an ideal (e.g. linear) response of a scintillation crystal to irradiation and the actual (non-linear) response measured during the calibration cycle. This table can be used to correct for this non-linear response of the crystal during a gauging cycle, as described in more detail below.

After sampling and storage of the first table is completed, the scintillation camera has an initial output signal $V_{I2}$ which, for example, is the same as $V_{F1}$ discussed above. At time $T_2$ (FIG. 5) the intensity level of radiation incident on the scintillation crystal is abruptly changed back to its original level ($I_1$). Simultaneously, the output signal from the scintillation camera is periodically sampled (for example at one second intervals), digitized, and stored in storage means 19 under control of data processor 21. Sampling continues for a predetermined time (for example two minutes), generally sufficient to enable the output of the scintillation camera to arrive at a steady state value.

Figure 5:
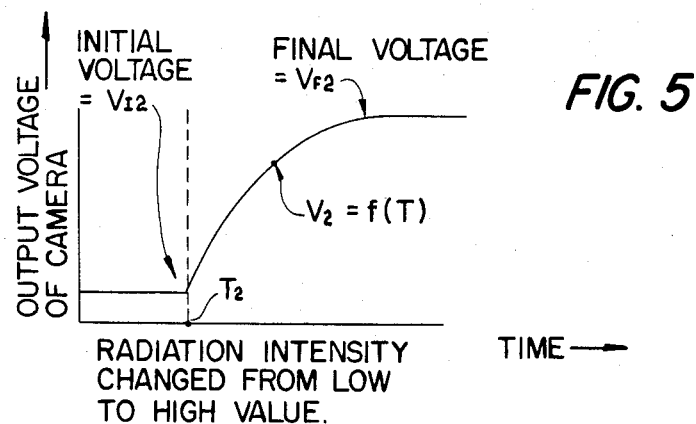

The output of the scintillation camera at any given moment during this process is a non-linear function of time and can be expressed mathematically as $V_2 = f(T)$, where $V_2$ is the amplitude of the camera output and T is time. After the predetermined time period for sampling has elapsed, the scintillation camera will have a final value $V_{F2}$ (FIG. 5). During this second sampling period the data processor stores data representative of a table of $(V_{F2} - V_2)$ vs. time, similar to that stored during the first sampling period. This completes the calibration cycle.

Figure 6:
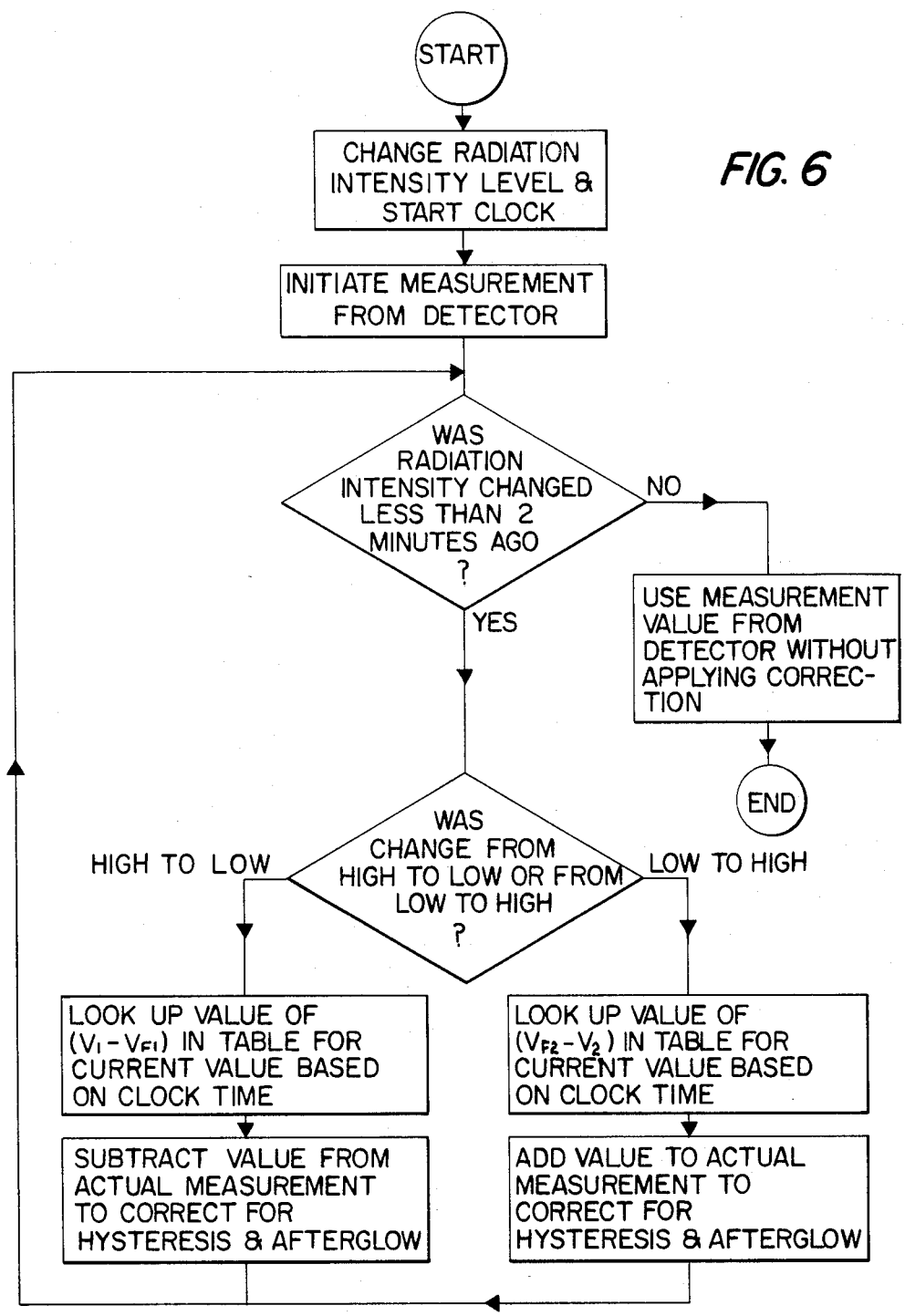
FIG. 6 is a flow chart showing the steps performed during gauging a sample of unknown thickness.

Referring to FIG. 6, there is shown a flow chart of the various steps performed in gauging a sample 11 of unknown thickness (FIG. 1) under conditions where the intensity of radiation on crystal 5 may vary. After performing the crystal calibration steps outlined above and radiation source and sample calibration steps as outlined in the aforementioned U.S. Pat. Nos. 4,009,376 and 4,119,846, the radiation gauging apparatus is ready to perform a gauging measurement cycle, typically of the thickness of unknown sample 11. The gauging cycle proceeds in a straightforward manner as described in the aforementioned U.S. patents by sampling the output of the scintillation camera and correlating this output with the thickness of known standards 3 to produce a measurement of the actual thickness of unknown sample 11 or its deviation from a predetermined nominal thickness.

Data processor 21 includes a clock function (used previously during the crystal calibrating steps) which is started at the beginning of each gauging cycle whenever there is a change made in the intensity of beam 7. The clock function of the data processor keeps track of how much time has elapsed since the most recent change in radiation intensity. If more than a predetermined time (for example two minutes) has elapsed since the last change in intensity, it is assumed that scintillation crystal 5 is unaffected by hysteresis or afterglow and no correction need be made to the measurements of the sample 11. However, if less than the predetermined time period has elapsed, then a correction factor for afterglow and hysteresis of the scintillation crystal is applied to the measurement signals $V_o$ being output by the scintillation camera and stored by the data processor.

The correction factor is defined by the previously stored tables of $(V_1 - V_{F1})$ vs. time and $(V_{F2} - V_2)$ vs. time. At any particularly instant $T_i$ the correction factor will be given by the value of $(V_1 - V_{F1})_i$ or $(V_{F2} - V_2)_i$. If the detected change in radiation intensity at a particular time $T_i$ is from a high level to a low level, the value of the correction factor $(V_2 - V_{F1})_i$ is subtracted from the value of the output signal $V_o$ representative of the actual measurement being made of sample 11. If the detected change in radiation intensity at a particular time $T_i$ is from a low level to a high level, the value of the correction factor $(V_{F2} - V_2)_i$ is added to the value of the output signal $V_o$. The above steps of determining whether the intensity has been changed during the predetermined time period and correcting for afterglow and hysteresis continue until the gauging cycle is completed.

It will be appreciated that by initially calibrating the scintillation crystal in accordance with the method of the present invention, gauging of an unknown sample can be performed even under conditions where the beam intensity is changing. In prior gauging systems a gauging cycle could not be performed during or immediately after large changes in beam intensity due to the effects of hysteresis and afterglow on the scintillation camera.

While the present invention has been described in considerable detail, it is understood that various changes and modifications would be apparent to those skilled in the art. For example, the method may be performed in a real-time or off-line fashion with the above-described data processor under program control. The data processor could be replaced by apparatus of conventional design dedicated to the task of performing the calibrating and/or gauging cycles. The sequence of changes in beam intensity during the calibration cycle may be reversed, and of course other sampling periods and time intervals can be used depending on the response of the particular scintillation crystal material.

The foregoing is not intended to be limitive but only illustrative of the invention which is defined by the appended claims.

What is claimed is:

1. A method of calibrating a scintillation crystal, comprising the steps of:

irradiating said scintillation crystal at a first intensity level with a beam of electromagnetic radiation to which said crystal is sensitive;

abruptly changing said beam intensity to a second level substantially different than said first level;

periodically measuring the output of said scintillation crystal during said irradiating steps and generating data representative thereof;

correlating said data representative of said scintillation crystal output with data representative of a predetermined response function of said crystal; and storing said correlated data in the form of a table of time dependent correction factors for said scintillation crystal.

2. The method of claim 1 further including the step of abruptly changing said second intensity level back to said first intensity level after a period of time.

3. The method of either claim 1 or 2 wherein said first intensity level in a relatively high intensity level and said second intensity level is substantially less than said first level.

4. The method of either claim 1 or 2 wherein said second intensity level is a relatively high intensity level and said first intensity level is substantially less than said second level.

5. The method of either claim 1 or 2 wherein said first and second intensity levels differ by a factor of approximately 100 or greater.

6. The method of either claim 1 or 2 wherein said electromagnetic radiation is X-ray or gamma-ray radiation.

7. In a thickness gauge of the radiation absorption type including means for generating a beam of penetrating electromagnetic radiation, a scintillation crystal sensitive to said electromagnetic radiation, means for detecting and measuring the output of said scintillation crystal and for generating data representative of said scintillation crystal output, and means for storing said data and for controlling the operation of said gauge, a method of calibrating the scintillation crystal, comprising the steps of:

irradiating said scintillation crystal at a first intensity level with said beam of electromagnetic radiation;

abruptly changing said beam intensity to a second level substantially different than said first level;

abruptly changing said beam intensity back to substantially said first level after a period of time;

periodically measuring the output of said scintillation crystal during said irradiating steps and generating data representative thereof;

correlating said data representative of said scintillation crystal output with data representative of a predetermined response function of said crystal; and storing said correlated data in the form of a table of time dependent correction factors for said scintillation crystal whereby the effects of hysteresis and afterglow of said crystal can be compensated for.

8. The method of claim 7 further including the steps of:

measuring the intensity of radiation incident upon said scintillation crystal when an article of unknown thickness is interposed in said beam during a gauging cycle and generating data representative thereof; and correlating said data representative of said measured incident radiation with said stored correction factor data obtained during said calibration steps, whereby the output of said scintillation crystal is corrected for hysteresis and afterglow during said gauging cycle.

9. The method of claim 8 wherein said correlating step includes the steps of:

determining whether said beam intensity has changed during a predetermined time period, and if so, the direction of such change; and applying a correction factor to said scintillation crystal output from said stored table of data, said correction factor being based on the direction of change of said beam intensity and the time elapsed since said beam intensity has changed.

10. The method of any one of claims 7, 8 or 9 wherein said first intensity level is a relatively high intensity level and said second intensity level is substantially less than said first level.

11. The method of any one of claims 7, 8 or 9 wherein said second intensity level is a relatively high intensity level and said first intensity level is substantially less than said second level.

12. The method of any one of claims 7, 8 or 9 wherein said first and second radiation intensity levels differ by a factor of approximately 100 or greater.

13. The method of any one of claims 7, 8 or 9 wherein said penetrating electromagnetic radiation is X-ray or gamma-ray radiation.

* * * * *